(12) United States Patent
Paul-Hus et al.

(10) Patent No.: US 12,255,447 B2
(45) Date of Patent: Mar. 18, 2025

(54) CONDUIT GUIDE AND SPACER SYSTEM

(71) Applicant: Quantum Loophole, Inc., Austin, TX (US)

(72) Inventors: Richard Paul-Hus, Sebring, FL (US); Shane A. Canekeratne, Redwood City, CA (US); Ronald Ivie, Austin, TX (US)

(73) Assignee: Quantum Loophole, Inc., Austin, TX (US)

( * ) Notice: Subject to any disclaimer, the term of this patent is extended or adjusted under 35 U.S.C. 154(b) by 214 days.

(21) Appl. No.: 17/966,633

(22) Filed: Oct. 14, 2022

(65) Prior Publication Data

US 2023/0119529 A1    Apr. 20, 2023

Related U.S. Application Data

(60) Provisional application No. 63/257,653, filed on Oct. 20, 2021.

(51) Int. Cl.
  *F16L 3/22* (2006.01)
  *H02G 9/06* (2006.01)

(52) U.S. Cl.
  CPC . *H02G 9/06* (2013.01); *F16L 3/22* (2013.01)

(58) Field of Classification Search
  CPC .................................... H02G 9/06; F16L 3/22
  See application file for complete search history.

(56) References Cited

U.S. PATENT DOCUMENTS

| | | | |
|---|---|---|---|
| 3,464,661 A * | 9/1969 | Alesi | F16L 3/2235 248/68.1 |
| 3,926,004 A | 12/1975 | Baylor | |
| 4,183,484 A | 1/1980 | Mathews | |
| 4,601,447 A * | 7/1986 | McFarland | F16L 3/222 248/68.1 |
| 5,274,684 A | 12/1993 | Yoshida et al. | |
| 5,605,419 A | 2/1997 | Reinert | |
| 7,223,052 B1 * | 5/2007 | Evans | F16L 1/10 248/68.1 |
| 7,828,251 B2 * | 11/2010 | Tollefson | E04C 5/20 248/68.1 |
| 2012/0152870 A1 | 6/2012 | Masters et al. | |
| 2017/0328495 A1 * | 11/2017 | Gross | B29C 48/0022 |

FOREIGN PATENT DOCUMENTS

FR    2790877 A1    9/2000

\* cited by examiner

*Primary Examiner* — Carib A Oquendo

(57) ABSTRACT

A system, method, and devices are disclosed herein for feeding sections of conduit through a guide device which positions the conduit sections for bundling and then bundling the sections of conduit with a spacer device comprising a pair of brackets which encircle the conduit bundle and are banded together. In one implementation of the technology, a device for guiding conduit sections comprises an outer frame which encloses walls which intersect to form a grid. The grid comprises multiple channels through which multiple sections of conduit pass in parallel. In another aspect of the technology, a system of feeding and organizing multiple sections of conduit from conduit reels to a conduit guide and spacer system is provided.

20 Claims, 17 Drawing Sheets

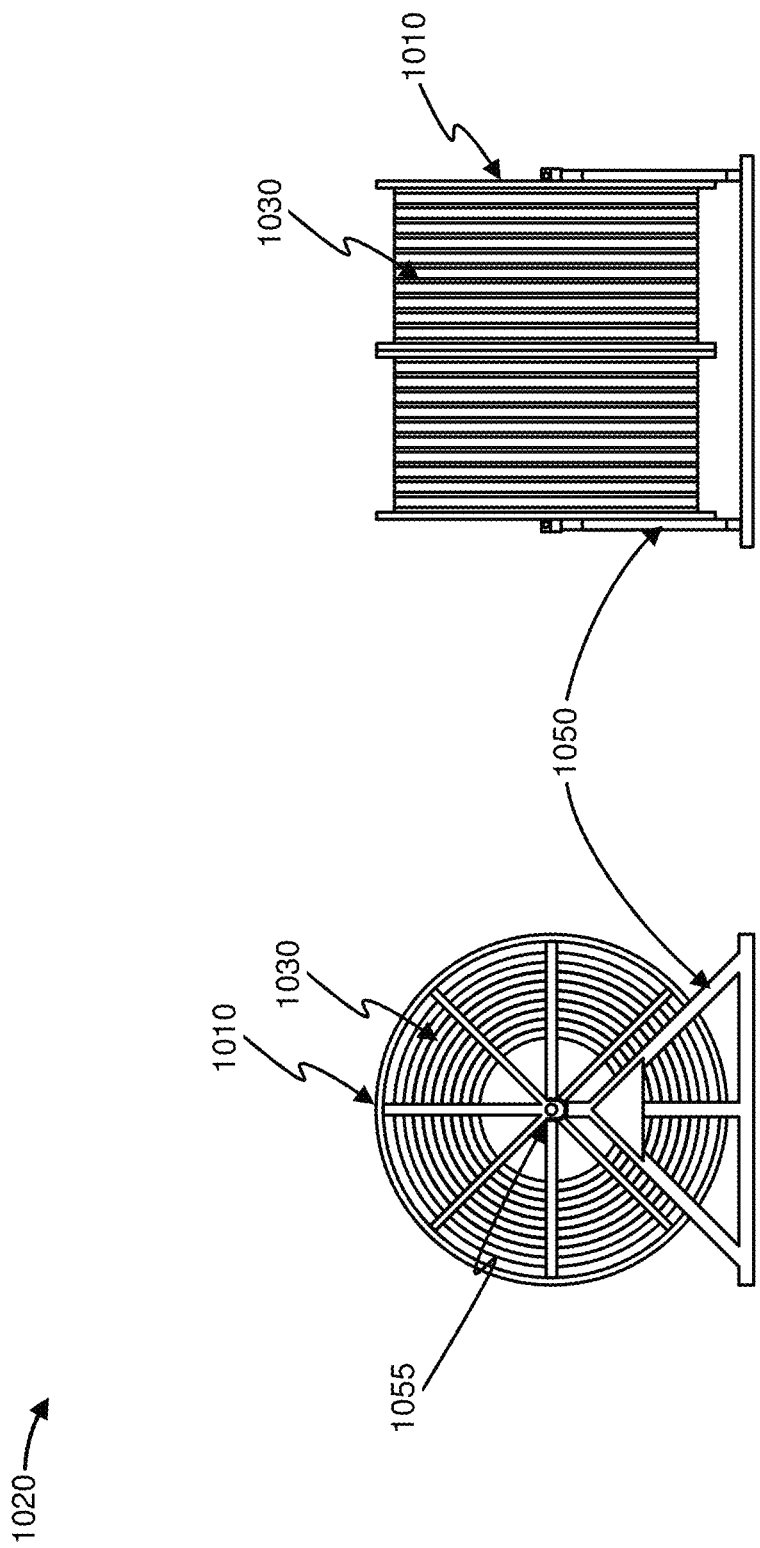

CONDUIT GUIDE AND SPACER SYSTEM

CROSS REFERENCE TO RELATED APPLICATION

This application claims priority to and benefit from U.S. Provisional Patent Application No. 63/257,653 titled "Conduit Guide and Spacer System" filed on Oct. 20, 2021, which is expressly incorporated by reference herein.

TECHNICAL FIELD

This technology relates generally to the installation of conduit, pipes, or protective tubing to house and protect underground electrical or data transmission cables when building a long-distance network of data or electrical transmission lines.

BACKGROUND

Data centers typically require vast amounts of fiber optic cabling to handle the data traffic that travels between data centers and other data consumers and producers. Because data traffic often travels miles, underground installation of fiber optic cable is typically required. To install fiber optic cabling underground, conduits for housing the fiber optic cable are buried in trenches through which the fiber optic cable will be pulled. This conduit protects the fiber optic cabling from physical and environmental damage and provides a way to access the cable after installation is complete to repair or upgrade the lines or to splice in branching lines. And when more capacity is needed to handle increasing data traffic, additional fiber optic cable can be pulled through the underground conduits to handle the increased load.

A typical method of installing multiple runs of conduit or ducting underground for, say, electrical power lines, is the duct bank process. In this process, multiple parallel sections of ducting made of a relatively rigid material such as PVC are assembled into duct banks above ground using rebar frames and/or concrete encasement to hold the duct sections in position. Each duct bank is then lowered into the trench by a process called slinging or other heavy equipment. Because these duct banks are constructed in multiple straight sections which are then pieced together, their length will be dictated by transportation and handling constraints. In some installations, the duct banks are assembled in the trench rather than above ground. This complicates installation because the trench must be dug more broadly, steps created, or trench boxes known as shoring must be used for the safety of the construction workers per OSHA standards.

For installing fiber optic cable underground, conduit is typically made from relatively lightweight and flexible material such as HDPE (high-density polyethylene). Very long lengths of conduit are transported in reels to the job site for installation. During installation, the conduit is unreeled from a trailer and laid in the underground trench, and sections of conduit are run over long distances. Where multiple sections of conduit are laid in a single trench over long distances, the conduit can end up entangled or in disarray. This disarray makes identifying conduit for assignment, splicing, or repair after installation more difficult. Moreover, because fiber optic cable must be pulled or blown through the conduit after install, any extraneous bends or undulations in the conduit will make installation more difficult, decrease the distance between access points, and increase the risk of damage to the cable. Laying sections of conduit individually may minimize such entanglement, but this adds substantially to the installation time when multiple lines of conduit are required.

Overview

A system, method, and devices are disclosed herein for configuring and bundling conduit sections for installation in the construction of a conduit network for housing data communications or electrical transmission lines. In an implementation of the technology, a device for guiding conduit sections comprises an outer frame which encloses walls which intersect to form a grid. The grid comprises multiple channels through which multiple sections of conduit pass in parallel. Each channel is sized to allow a single section of conduit to pass through.

In one implementation of the guide device, the outer frame comprises an outer wall, and flanges extend from the front-facing edges of the outer wall. In another implementation of the guide device, the outer frame forms a rectangle and the intersecting walls enclosed by the outer frame form square-shaped channels. Still other implementations may have grids with channels arranged in other patterns, such as a honeycomb pattern, and the grids may be enclosed by an outer frame taking various shapes, such as a polygonal or circular shape.

A method is disclosed herein for feeding sections of conduit through a guide device and bundling the sections of conduit with a pair of brackets which encircle the conduit bundle and are banded together.

A system is disclosed herein comprising a guide device and a spacer device. The spacer device comprises a pair of brackets which bundle the conduit sections together. Each bracket has arcuate indentations along its interior face conforming to a preferential conduit size. Each bracket has a channel indentation on its exterior face running the length of the bracket. The pair of brackets are held together by a band which wraps around the brackets and sits in the channel indentations.

This Overview is provided to introduce a selection of concepts in a simplified form that are further described below in the Detailed Description. This Overview is not intended to identify key features or essential features of the claimed subject matter, nor is it intended to be used as an aid in determining the scope of the claimed subject matter.

While multiple implementations are disclosed, still other implementations of the technology will become apparent to those skilled in the art from the following detailed description. As will be realized, aspects of the technology are capable of modifications, all without departing from the scope of the technology. Accordingly, the drawings and detailed description are to be regarded as illustrative in nature and not restrictive.

BRIEF DESCRIPTION OF THE DRAWINGS

FIGS. 10A, 10B, and 10C illustrate a reel support system for a conduit trailer system in an implementation.

Figure 1A:
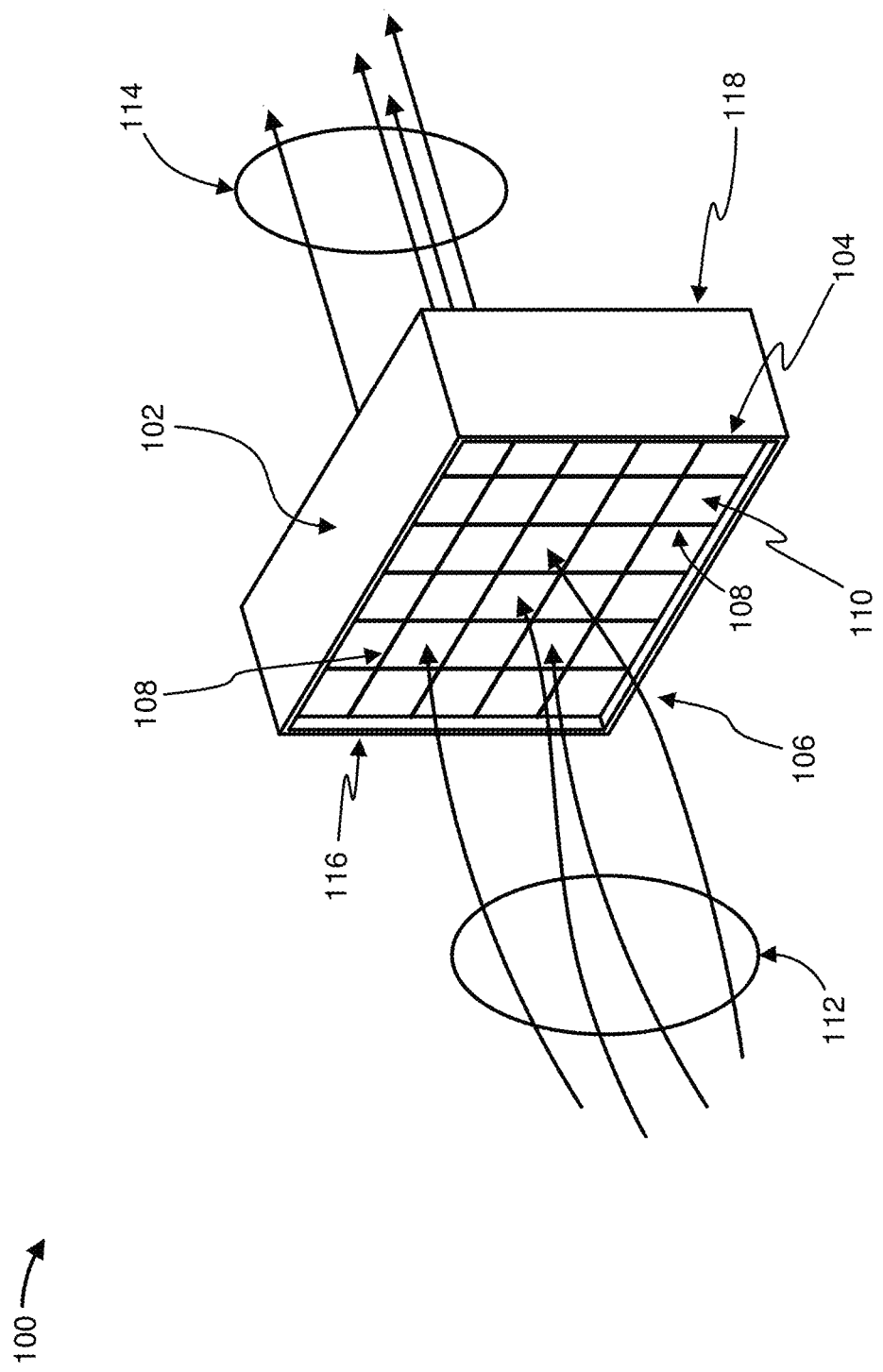
FIGS. 1A and 1B illustrate exemplary implementations of a guide device.

The drawings have not necessarily been drawn to scale. Similarly, some components and/or operations may be separated into different blocks or combined into a single block for the purposes of discussion of some of the implementations of the present technology. Moreover, while the technology is amenable to various modifications and alternative forms, specific embodiments have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Implementations of the technology will now be described in detail with reference to several implementations illustrated in the accompanying drawings. In the following description, numerous specific details are set forth in order to provide a thorough understanding of implementations of the technology. It will be apparent, however, to one skilled in the art, that implementations may be practiced without some or all of these specific details. In other instances, well known process steps and/or structures have not been described in detail in order to not unnecessarily obscure the technology. The features and advantages of implementations may be better understood with reference to the drawings and discussions that follow.

Aspects, features and advantages of exemplary implementations will become better understood with regard to the following description in connection with the accompanying drawings. It should be apparent to those skilled in the art that the described implementations are illustrative only and not limiting, having been presented by way of example only. All features disclosed in this description may be replaced by alternative features which serve the same or similar purpose, unless expressly stated otherwise. Therefore, numerous other implementations of the modifications thereof are contemplated as falling within the scope of the technology as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the technology as the implementations disclosed herein are merely exemplary.

Underground duct or conduit systems are used to run electrical or data transmission lines over distances from tens of meters to miles or more, often enabled by the availability of preexisting utility or railroad easements or other land licenses. Ducts or conduits house and protect such lines from physical and environmental damage while providing access to the lines for upgrade or repair as well as allowing transmission lines to be added as the need for such capacity grows.

Among the types of transmission lines that are commonly run over long distances, fiber optic cable provides high-speed, high-capacity data transmission with very low latency. Fiber optic networks are often overbuilt in anticipation of an ever-increasing need for transmission capacity by running multiple lines of conduit through which more lines of fiber optic cable can be added as the need arises. In addition, fiber optic capacity can be commodified in that companies may lease or sell their unused fiber optic transmission lines. Thus, fiber optic cables must be locatable and identifiable at any point in a network.

Fiber optic cable, of which glass fiber is a key component, is somewhat rigid and brittle material that requires protection from physical and environmental damage when installed underground. Such cable typically requires a bend radius of at least 15 to 20 times the outer diameter of the cable. To run fiber optic cable across long distances underground, conduits are used to easily install, remove, repair, house, and protect the cable. These conduits are flexible tubes which are laid in multiples sections over hundreds of meters in below-ground trenches with junction or access points connecting one section to the next. Given the cost of installation, it is cost-efficient to lay multiple lines of conduit in a trench in anticipation of adding fiber optic capacity as the need for such capacity grows over time.

After the conduit is laid, the fiber optic cable can be blown or pulled through the conduit. The limitations on how much installation force the fiber optic cable can sustain before the cable is damaged constrains the length of the conduit sections according to the installation method and cable specifications. In addition, because the conduit commonly used for fiber optic cabling is relatively lightweight and flexible, it is prone to bending. This is problematic because any extraneous bends or undulations in the conduit will increase friction against pulling, which in turn increases the force needed to pull the cable. Alternatively, fiber optic lines are encased in inner ducts or subducts which are pulled through the conduit. These inner ducts or subducts typically have coatings which lower the coefficient of friction to ease pulling, and they provide an additional layer of protection for the fiber optic cable.

The devices, system, and method described herein provide a method for installing multiple sections of conduit using a guide device to guide parallel sections of conduit, preferentially positioning each section so that the sections can be bundled together with each conduit occupying a known position within the bundle. With each conduit occupying a known position in the bundle, that position remains constant along the entire length of the bundle and is consistent with other bundles connecting to the bundle at either end and thus throughout a network of such conduit bundles. In this way, the fiber optic cable capacity of each conduit can be assigned (for example, leased or sold) to third-party data consumers or producers. Further, bundling parallel lines of conduit together adds rigidity to the bundle as a whole which prevents extraneous bends and undulations in individual lines which can make adding transmission lines more difficult.

An exemplary guide device 100 for guiding sections of conduit 112 is shown in FIG. 1A. Guide device 100 has outer frame 102 which encloses grid 106 created by intersecting walls 108. The intersecting walls 108 create multiple channels 110. Sections of conduit 112 are continually fed into channels 110 at front face 116, pass through guide device 100, and exit through rear face 118. Each channel is sized to allow a single section of conduit, including conduit sections joined by low-profile couplers, to pass through. The front-facing edges of intersecting walls 108 may be rounded to minimize eroding the walls and the conduit sections as the sections move through channels 110. As sections of conduit 112 are funneled through guide device 100, each section of conduit is positioned according to the position of its channel in grid 106. Thus, the conduit sections exit guide device 100 in parallel and in position for bundling. Upon exiting guide device 100, the newly-positioned conduit sections 114 can be bundled together in the configuration created by guide device 100 using a spacer device as will be discussed below. In an implementation, guide device 100 may be manufactured in steel to withstand wear and tear.

As will be appreciated by those skilled in the art, there are numerous implementations of the technology. In one aspect of the technology, multiple conduit sections may be fed through guide device 100 simultaneously or one section of conduit at a time. In another aspect, the process of feeding the sections through guide device 100 may be done by hand (for example, by installation engineers or workers) or it may be part of an automated or mechanized process. In still other implementations, guide device 100 may be positioned at ground level, above ground, or below ground for conduit installation as would be deemed to be most appropriate for the particular terrain or accessibility or other contextual variables relevant to the installation. For example, for a below-ground installation, a guide device 100 may be positioned in the trench.

Figure 1B:
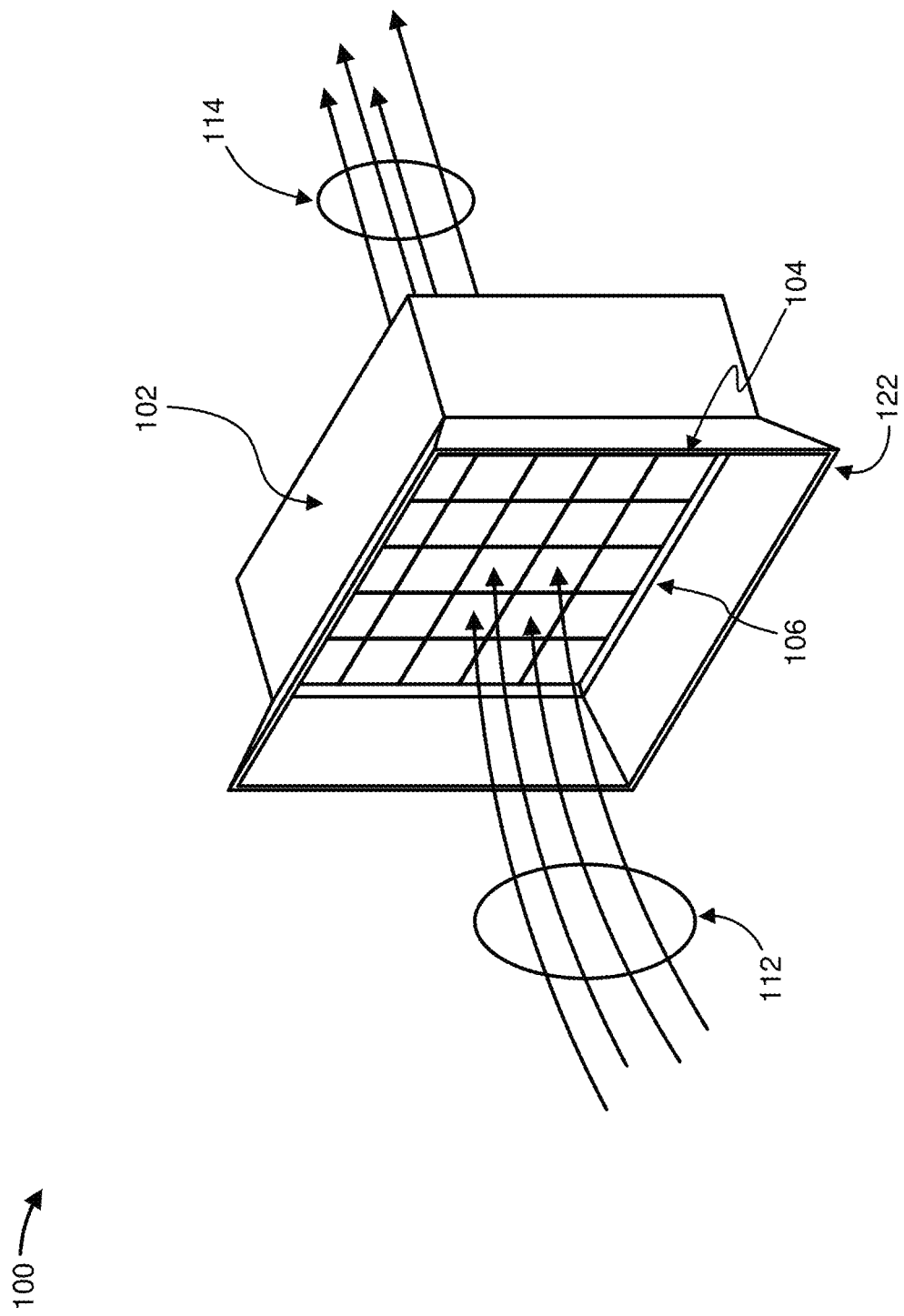
Figure 1C:
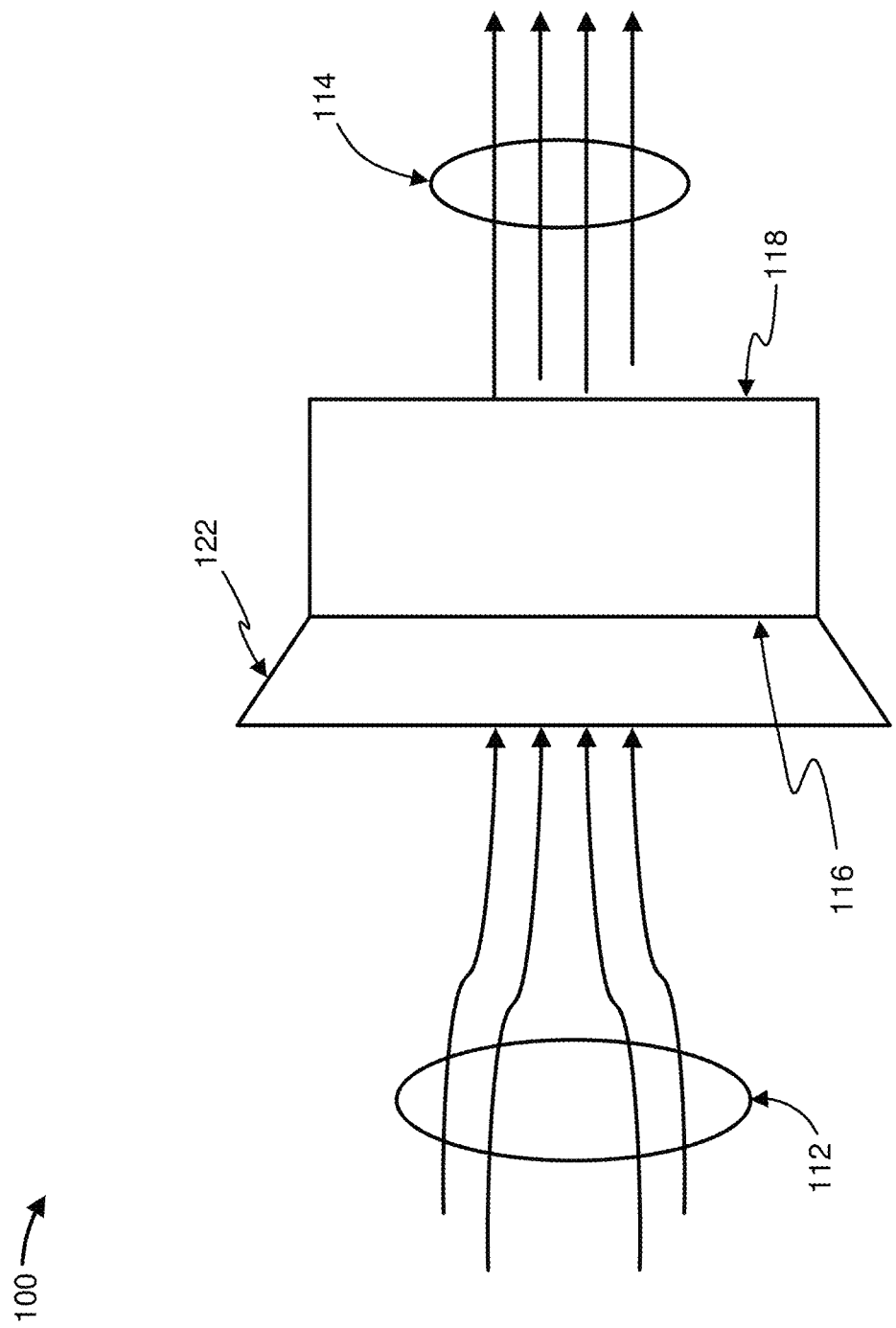
FIG. 1C illustrates a side view of an exemplary implementation of a guide device.

Another implementation of a conduit guide is shown in an isometric view in FIGS. 1B and 1n a side view in FIG. 1C. Guide device 120 comprises outer frame 102 which encloses grid 106 created by intersecting walls 108. Intersecting walls 108 create multiple channels 110, each of which is sized to allow a single section of conduit to pass through. Flanges 122 are attached to front edge 104 of frame 102 to direct entering sections of conduit 112 toward grid 106. Entering sections of conduit 112 are fed into channels 110 at the front face of guide device 120, pass through guide device 120, and exit through rear face 118. The front-facing edges of intersecting walls 108 may be rounded to minimize eroding the walls and the conduit sections as the sections move through channels 110. As sections of conduit 112 pass through guide device 120, each section of conduit is individually positioned according to the position of its channel in grid 106. Thus, the conduit sections exit guide device 120 in parallel and positioned for bundling. Upon exiting guide device 120, the newly-positioned conduit sections 114 can be bundled together in the configuration created by guide device 120 using a spacer device as will be discussed below.

This technology can be used to create a variety of ordered conduit bundle configurations for any number of conduit sections of various conduit diameters, with various bundle profiles and various channel configurations. In one implementation of guide device 100, walls 108 intersect orthogonally creating square channels 110 which position sections of conduit 112 in a row-by-column array configuration. For example, a six-row-by-five-column configuration creates a rectangular bundle of thirty conduit positions, with each of the thirty conduits identifiable at any point along the length of the conduit bundle by its position in the array. Many other array configurations may be similarly implemented, for example, rectangular arrays arranged two-by-three or four-by-five or square arrays arranged four-by-four or five-by-five. Grid channels of guide device 100 may be sized for commercially available conduit which typically ranges from one inch to four inches in diameter for housing fiber optic cable and may include additional margin in the sizing to accommodate conduit coupling devices. In some implementations, the top surface of a conduit bundle may be spray-painted or otherwise marked in a highly visible way at regular locations, such as at each spacer, along the length of the conduit bundle to provide an indication that the bundle is upright and has not rolled during the install.

In some situations, the color of the conduit sections may be varied in a bundle to aid in identification of individual sections at install or later in use. For example, a color map or color configuration of the conduit in a bundle may map each of two or more colors of conduit according to its contents, use, customer, destination, etc. A color configuration may also facilitate installation by providing an immediate visual indication of the orientation of the conduit bundle as it is installed and as conduit bundles are joined.

In an alternative implementation of a guide device, the walls form a honeycomb configuration with hexagonal-shaped channels which may result in a more compact bundle than a row-by-column configuration for the same number of channels. In yet another implementation of a guide device, the channels may be arranged in concentric rings. The outer frame of the grid can have a profile which accords with the channel configuration. For example, a hexagonal frame can enclose a honeycomb configuration of channels, or a circular frame can enclose channels arranged in concentric rings.

Figure 2:
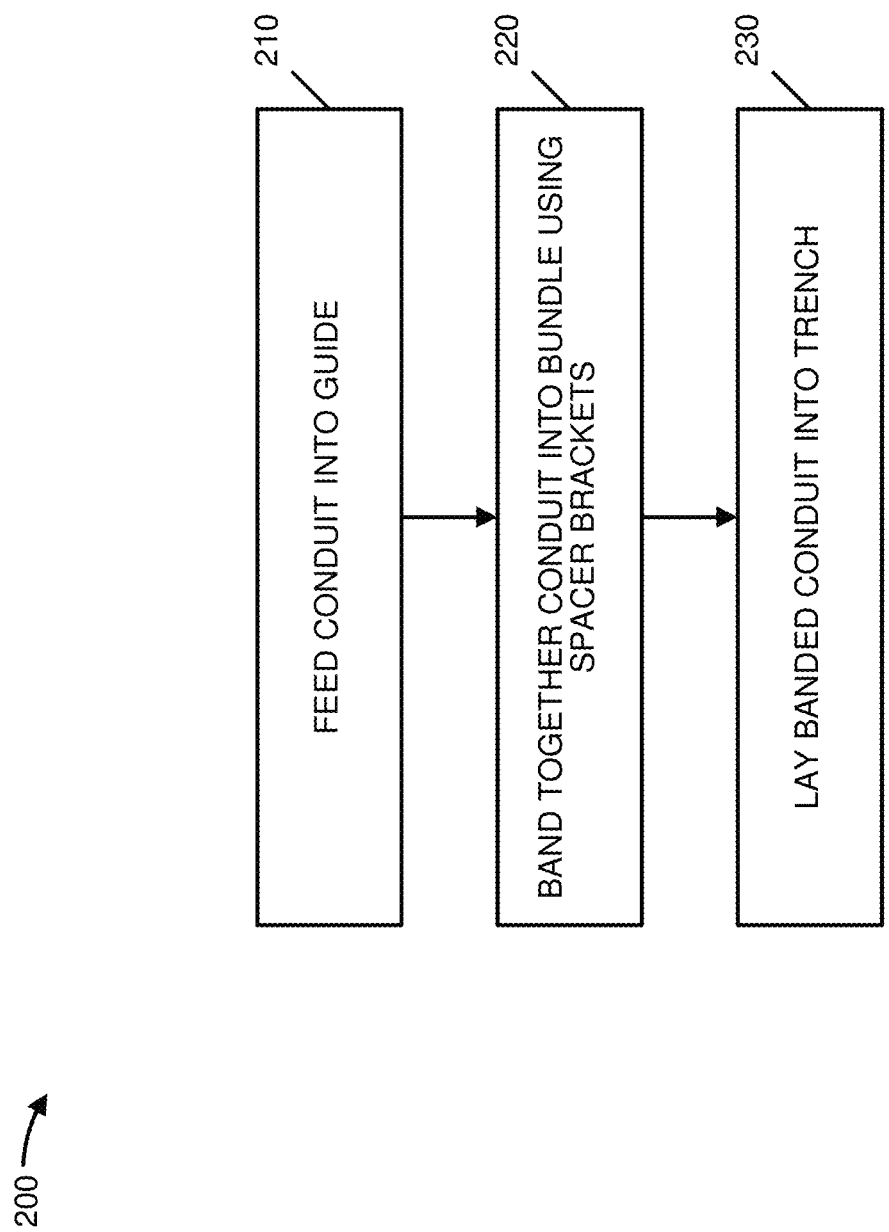
FIG. 2 is a flowchart illustrating an exemplary process for bundling and installing conduit using a guide device and spacer device.

An exemplary process of using the guide device and spacer devices to bundle sections of conduit is illustrated in the flowchart of FIG. 2. In this example, multiple conduit sections are to be installed underground. In the first step 210, multiple sections of conduit are simultaneously fed into the conduit guide device. The guide device positions each section of conduit to create a preferred bundle configuration. In the second step 220, as the sections of conduit exit the guide device, the sections of conduit are enclosed by a spacer device which holds the conduit sections in position within the bundle as configured by the guide device. Spacer devices are attached to the conduit bundle at multiple points at regular intervals along the length of the conduit bundle, for example, at ten-foot intervals. Finally, in step 230, the conduit bundle is laid in an underground trench for burial.

Those skilled in the art will appreciate that these steps may be implemented in a number of ways. The feeding process may proceed with multiple sections of conduit fed simultaneously, individually, or in subsets of the total number of sections to be installed. Conduit sections may be fed by hand into a guide device or as part of an automated or mechanized process. After passing through a guide device, the conduit sections may be enclosed in spacer devices at or near the rear face of the guide device or at some point farther away from the guide device, such as within the trench or other installation location.

Figure 3A:
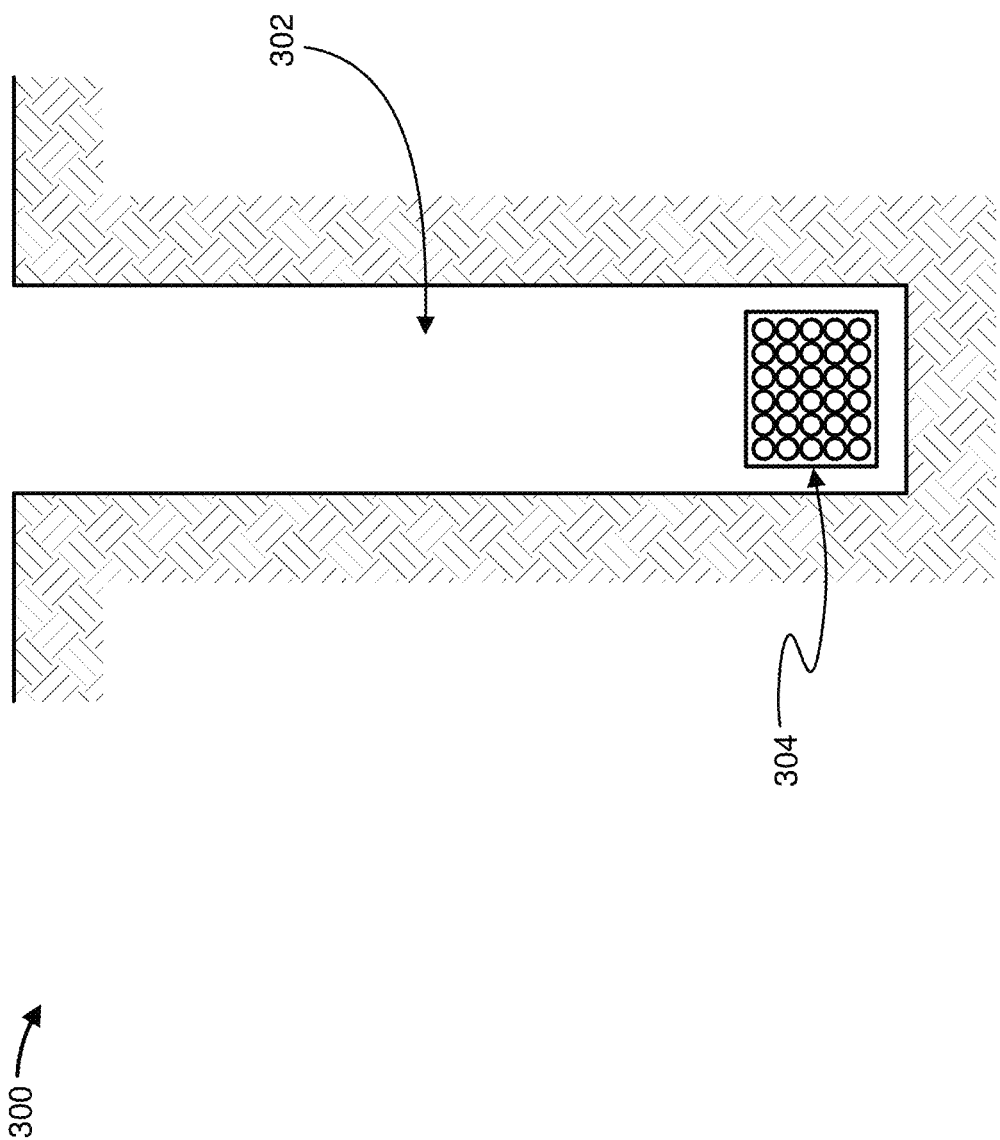
FIG. 3A is a schematic cross-sectional view illustrating an exemplary operating environment.

FIG. 3A illustrates a cross-sectional view 300 of exemplary conduit bundle 304 installed in trench 302 to house a network of data transmission lines which will be pulled through the conduit after installation. In this example, thirty conduit sections are positioned in a five-row-by-six-column array configuration to create bundle 304. Other array configurations may be implemented, for example, a three-by-four array of twelve conduits, a four-by-five array of twenty conduit sections, or a six-by-eight array of 48 conduit sections. Bundle 304 has a substantially rectangular cross section and is held in this configuration by a spacer device comprising two spacer brackets. Spacer devices are attached to bundle 304 at regular intervals along the length of bundle 304. For example, one spacer device may be installed every ten feet. Finally, conduit bundle 304 is laid at the bottom of trench 302. The number of conduits to be installed will depend on the current and near-future demand for data transmission capacity but can also include a number of additional conduits which will remain empty in the near-term but to which additional transmission lines can be added in the future, allowing the network transmission capacity to grow to meet future needs. Because the conduits have a consistent, ordered configuration over the entire network, the ability to add transmission capacity to the network will be a known, assignable quantity that can be leased or sold as needed.

Figure 3B:
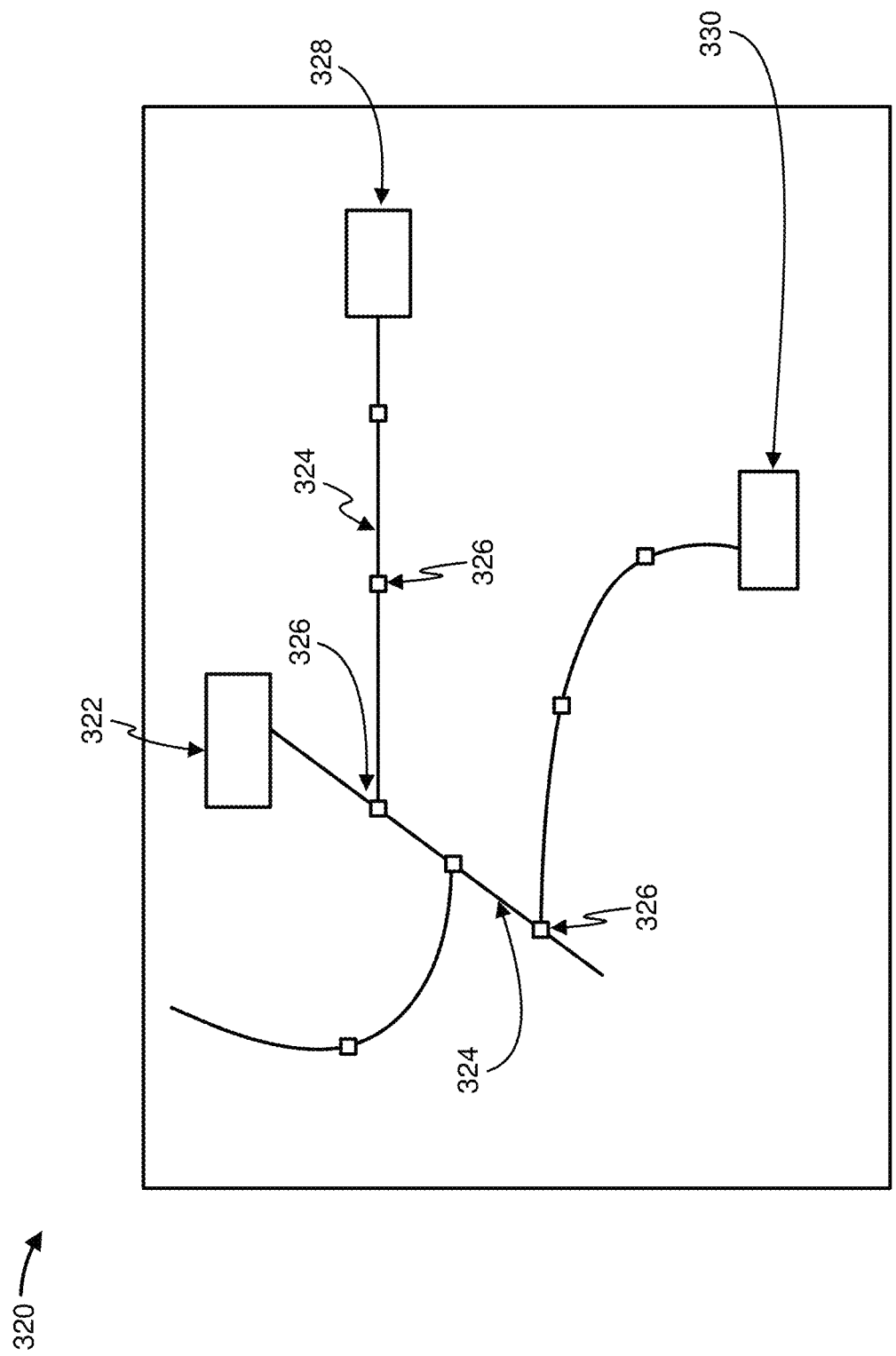
FIG. 3B is an overhead view of an exemplary operating environment.

FIG. 3B shows an exemplary map of a network of conduit 320. In this example, a fiber optic cable network is to be created to transmit data between a hyperscale data center 322 and data centers 328 and 330 and other data consumers or producers located elsewhere. To build a fiber optic network, a conduit network must be installed to house the fiber optic lines. The conduit network comprises a plurality of conduit sections held together in conduit bundles 324 created using a guide device and spacer devices disclosed herein. This network extends from hyperscale data center 322 through junctions 326 where conduit bundles can be spliced together to extend the network or where a subset of the conduits may branch off to connect to data centers 328 and 330 or to other data consumers or producers. After the conduit installation is complete, fiber optic cables can be pulled through conduit 324.

Because conduit bundle 324 has a consistent, ordered configuration throughout network 320 in FIG. 3B, the capacity of any conduit or subset of conduits at any point in network 320 can be allocated. As is shown in the conduit bundle cross-sectional view of FIG. 7, a subset of the thirty conduits in network 320 can be identified, assigned, and leased or sold to third parties either across the entire network or across a subsection of the network. In an implementation, conduits may be identified for their various uses according to a color map keyed to the various colors of the conduit sections.

For long-distance networks where transmission lines are run for miles, the technology may be implemented using vehicles or heavy equipment to expedite the installation process. In an exemplary implementation of the technology, reels of conduit, guide devices, and roller tamers which facilitate feeding the conduit sections into the guide devices can be mounted to trailers or truck beds so they may be frequently repositioned or continually moving forward as the installation proceeds at the rear of the procession along the installation route. Spacer devices may be enclosed around the conduit bundle as it emerges from a guide device in various locations such as shortly after exiting the guide device, closer to where the bundle is to be installed, or at the point of installation.

Figure 4:
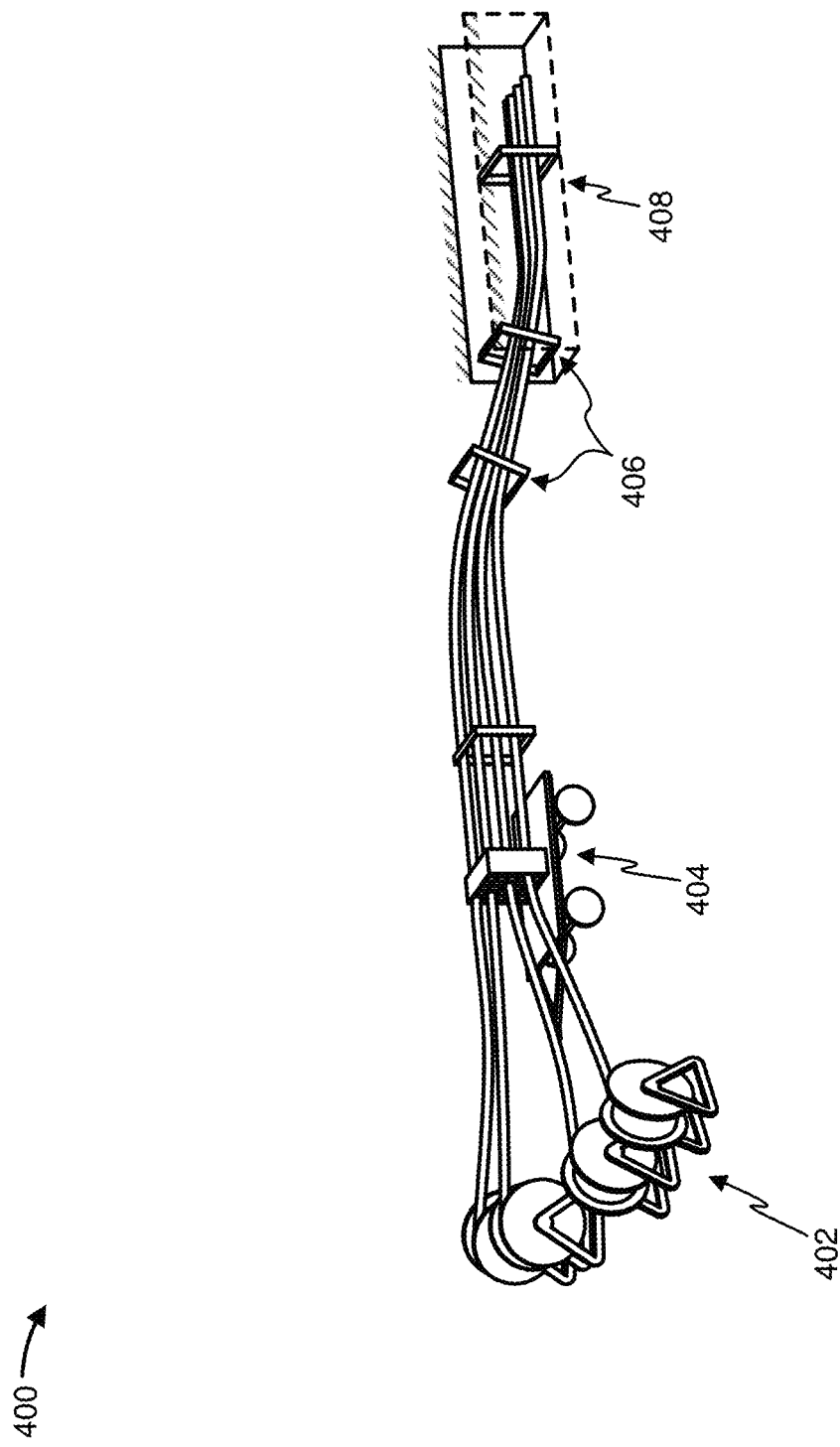
FIG. 4 illustrates an operational example of using a guide device and a spacer device.

FIG. 4 illustrates an exemplary process of installing a conduit bundle underground at a jobsite for the subsequent installation of data transmission lines. Sections of conduit from multiple reel trailers 402 are fed into a trailer-mounted conduit guide device 404. Guide device 404 is mounted to a trailer so that it can be repositioned as the conduit bundle is installed in trench 408. Guide device 404 can be secured to the trailer by one or more mounting flanges or mounting brackets affixed to the outer frame of guide device 404 which can then be bolted, clamped, or welded to the trailer bed or chassis. Guide device 404 is positioned on the trailer to allow the sections of conduit to pass through it unobstructed and horizontally. Sections of conduit exit guide device 404 in parallel with each section positioned for bundling. Upon exiting guide device 404, the sections of conduit are banded together using spacer devices 406 which are attached one at a time at regular intervals along the length of the conduit bundle, such as every ten feet. The bundled conduit is then laid in underground trench 408 and eventually buried. After installation of the conduit is complete, fiber optic cable can be pulled through the conduit to build a data network.

Other aspects of the installation shown in FIG. 4 may be appreciated by those skilled in the art. Guide device 404 may be bolted, clamped, or welded to a truck bed rather than a trailer. Bundled conduit may be installed in a suitable location at ground level or above ground, such as within a building, rather than below ground. Conduit diameter, construction, and material may dictate longer or shorter spacing between spacer devices attachment points. Conduit may house transmission lines other than fiber optic cable. Where the conduit is particularly heavy, rigid, or otherwise difficult to position, multiple guide devices may be positioned sequentially to configure the conduit prior to the attachment of the spacer devices.

Figure 5A:
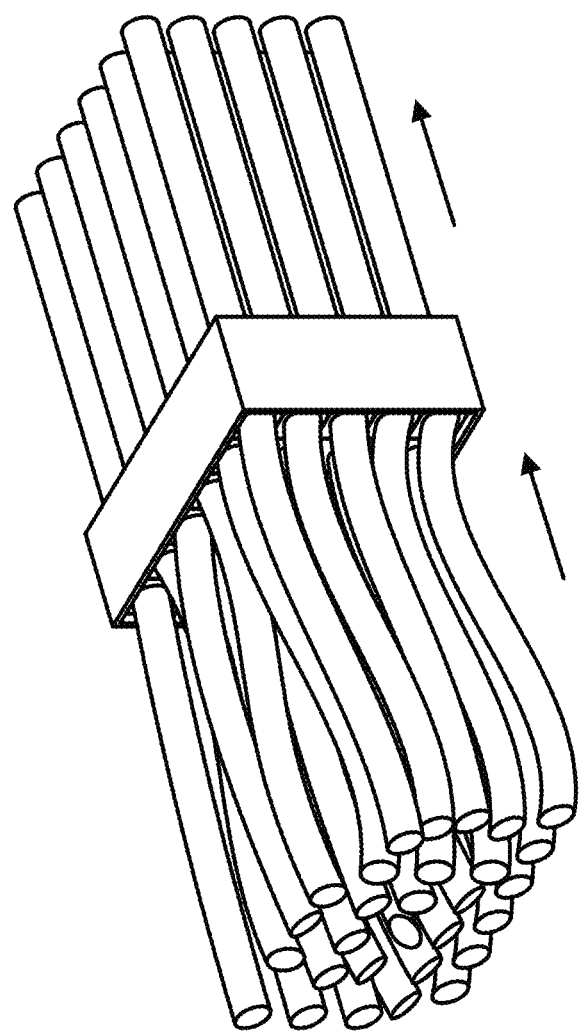
FIGS. 5A, 5B, and 5C illustrate examples of the stages of operation of using a guide device and a spacer device.
Figure 5B:
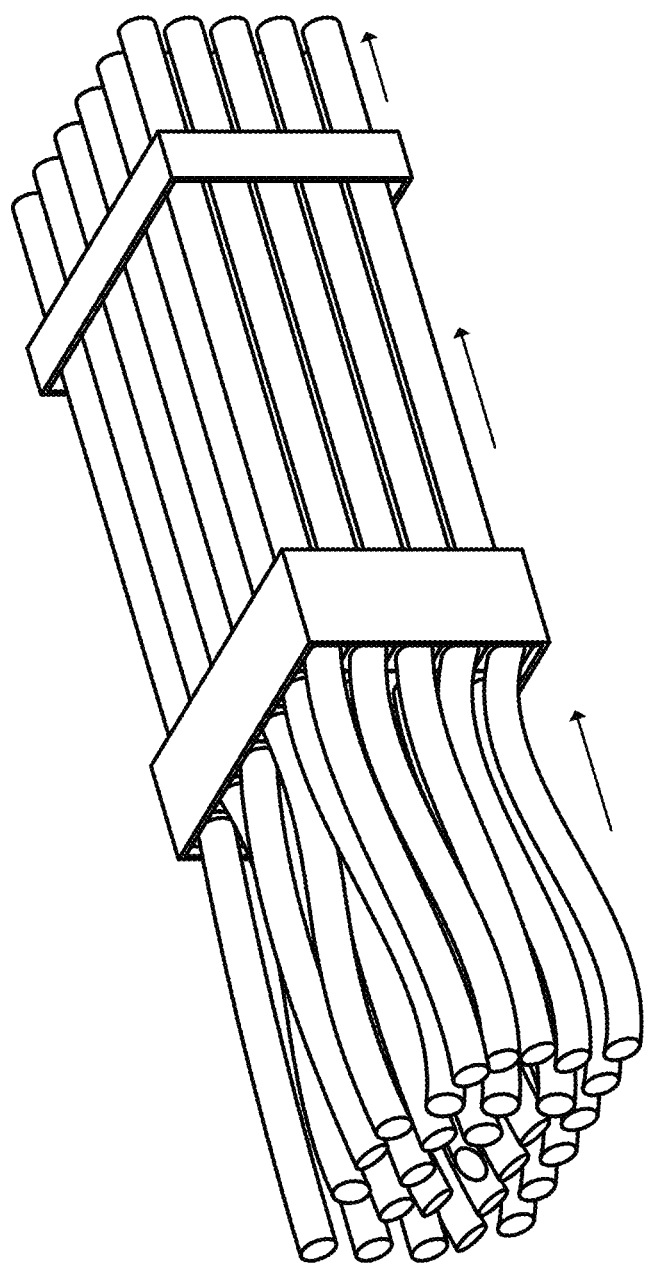
Figure 5C:
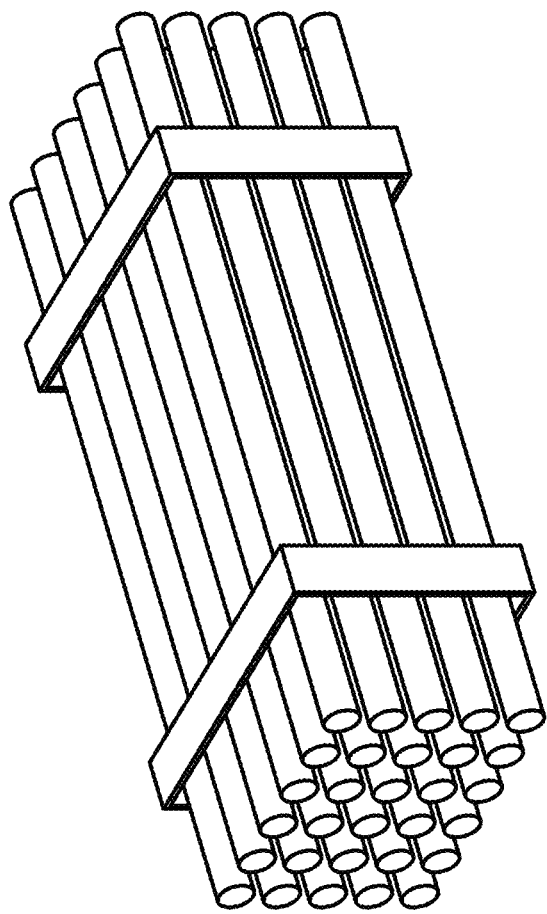

FIGS. 5A, 5B, and 5C illustrate system 500 of bundling multiple sections of conduit prior to installation in an implementation. In an exemplary implementation, system 500 illustrates the process of bundling multiple sections of conduit when a large quantity of transmission lines may be required to connect multiple locations. Multiple sections of conduit are installed to house and protect transmission lines such as fiber optic cable or fiber optic cable encased in inner ducts or subducts that are necessary to meet the current demand for transmission capacity along with excess capacity to receive additional lines as the need for transmission capacity grows over time.

First, in FIG. 5A, sections of conduit to be bundled are simultaneously funneled through a guide device, exiting the guide device in parallel and positioned according to the grid design of the guide device. In this step, the sections may be fed simultaneously, individually, or in subsets of the total number of sections to be installed. The conduit sections may be fed by hand or by an automated or mechanized process in which the conduit is unreeled and directed toward the guide device. The guide device may be augmented by flanges extending from the front edges of the guide device frame (as demonstrated in FIG. 1B) to assist in directing the incoming conduit sections toward the grid channels of the guide device.

In the next step shown in FIG. 5B, after exiting the guide device, the conduit sections are banded together with spacer devices to form a conduit bundle. The spacer devices enclose the conduit bundle, holding each of the sections of conduit in the bundle as it has been positioned by the guide device. The spacer devices maintain the bundle configuration and prevent the lines from becoming entangled or disordered. Each of the conduit sections which are positioned on the exterior of the conduit bundle will be seated into an arcuate indention on the interior face of the bracket which conforms to the shape of the conduit, thereby holding the conduit in position.

The spacer brackets comprising the spacer device are cinched together around the conduit bundle with pre-cut stainless-steel bands which are mechanically compressed using the appropriate tool or commercially available banding device, such as a Band-It® stainless-steel banding device. Cinching the spacer brackets together holds the conduit sections as they have been preferentially positioned by the guide device, preventing the sections from becoming disordered. Spacer devices are attached at regular intervals along the length of the bundle, for example, every ten feet or as the flexibility of the conduit material makes necessary. The attachment of the spacer devices may occur at a location near the rear face of the guide device or closer to the location of installation.

In FIG. 5C, the bundled conduit is ready for installation. For long-distance networks, conduit sections are typically installed in underground trenches. Alternatively, conduit may also be installed at ground-level or above-ground locations where a network of transmission lines is required. Where conduit sections are to be buried in an underground trench, the conduit sections may be secured with spacer devices prior to being laid in the trench to foreclose the need for workers to enter the trench, thus making the installation process faster, simpler, and safer. For at- or above-ground installations, bundled conduit can be installed in wall cavities or HVAC supply or return ducts as allowed by the applicable building code.

Figure 6:
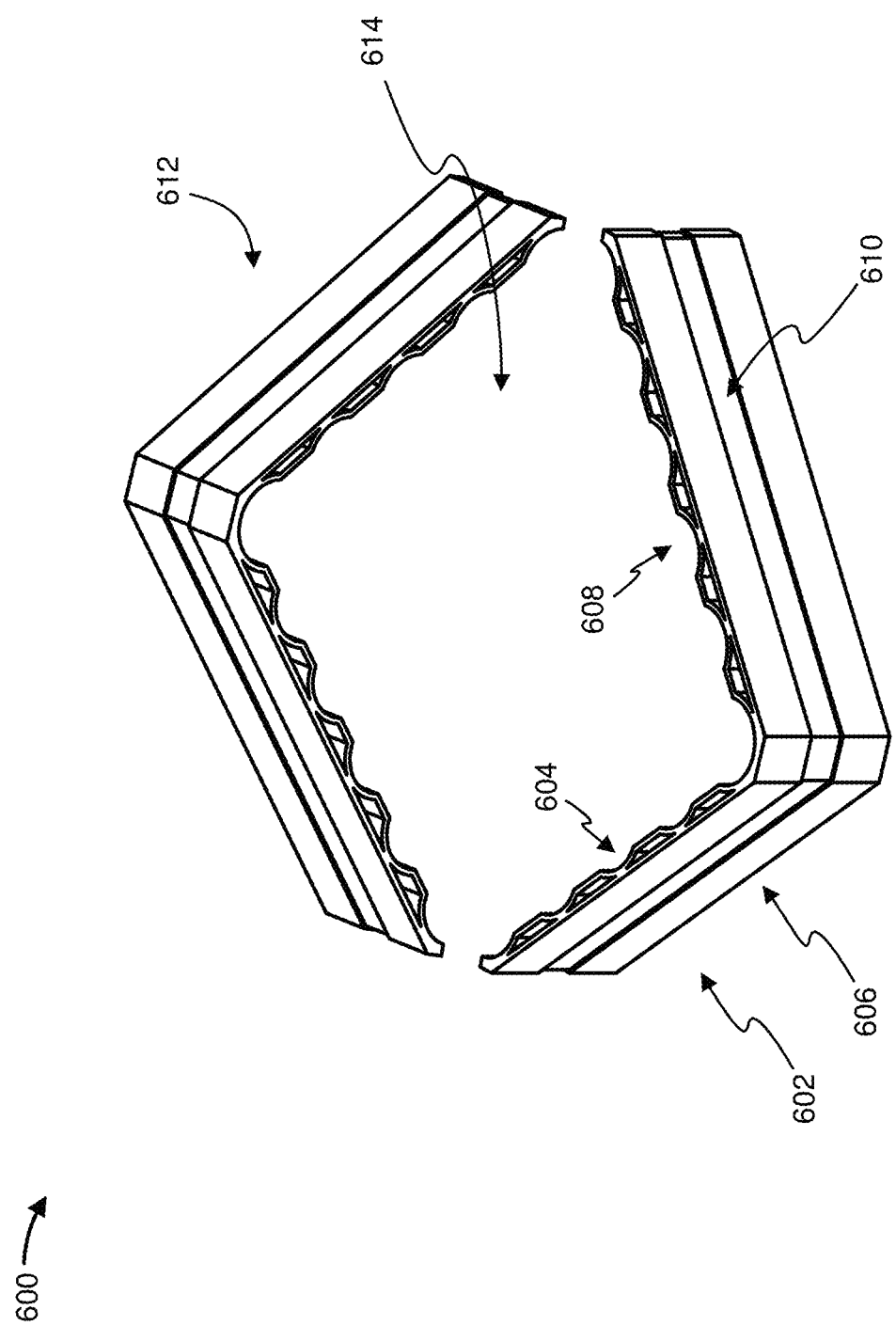
FIG. 6 shows an isometric view of a spacer device in an implementation.

FIG. 6 illustrates an implementation of spacer device 600 comprising two spacer brackets 602 and 612. Spacer device 600 is used to bundle together parallel sections of conduit exiting a guide device, examples of which are guide devices 100 and 120 of FIGS. 1A, 1B, and 1C, holding the individual conduit sections together in the bundle as they have been positioned by the guide device. Space brackets 602 and 612 may be manufactured in polyethylene and/or polycarbonate material.

Spacer brackets 602 and 612 are positioned opposite one another to form a rectangular space 614 through which the conduit sections pass. Each of spacer brackets 602 and 612 has a series of arcuate indentations 604 along its interior face 608 which conform to the conduit bundle cross-sectional profile. Each of the conduit sections that are positioned on the exterior of the conduit bundle will fit into an arcuate indentation in a spacer bracket.

Along exterior faces 606 of spacer brackets 602 and 612 is channel 610 which runs the length of the brackets. Spacer brackets 602 and 612 can be cinched together around the conduit bundle by a commercially available banding device such as a Band-It® stainless steel banding device. When brackets 602 and 612 are cinched together, the band or tying device will be held in position by preferentially occupying channels 610 which will in turn fix the conduits positioned on the exterior of the bundle in place and prevent the conduits in the interior of the bundle from being displace from their guided positions.

Figure 7:
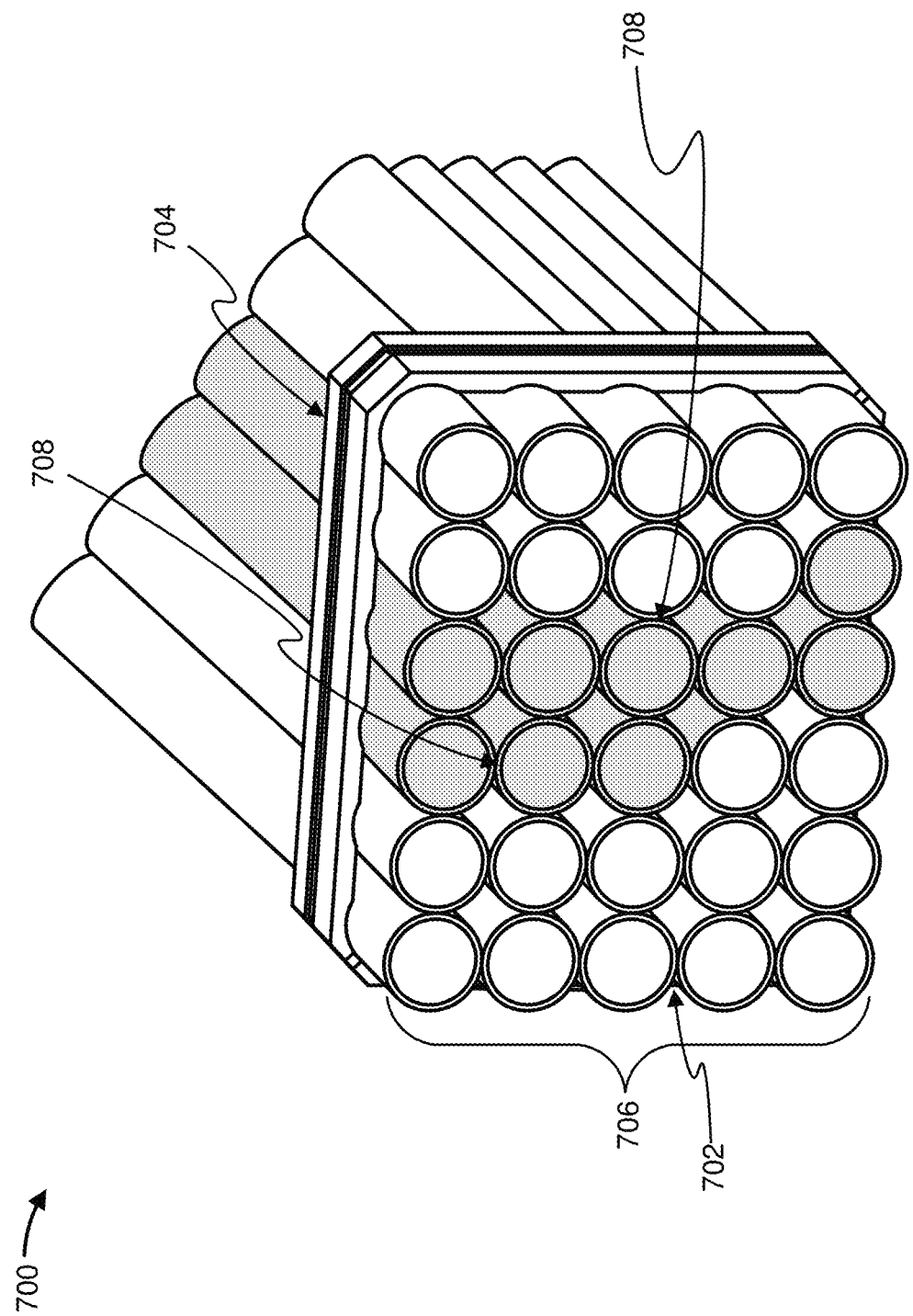
FIG. 7 illustrates an exemplary implementation of a spacer device for bundling conduit enclosed around an exemplary conduit bundle configuration of thirty conduit sections.

An isometric view of an exemplary implementation of a spacer device 700 is shown in FIG. 7. In FIG. 7, an exemplary configuration of thirty conduit sections 708 is configured in a six-row-by-five-column array upon exiting a guide device, examples of which are guide devices 100 and 120 of FIGS. 1A, 1B, and 1C, holding the individual conduit sections together in the bundle as they have been positioned by the guide device. Spacer device 700 comprising spacer brackets 702 and 704 is enclosed around conduit sections 708 creating conduit bundle 706. Each of the eighteen conduits that are positioned on the outside of bundle 706 will fit into an arcuate indentation in spacer bracket 702 and/or 704. Spacer brackets 702 and 704 are cinched together around conduit bundle 706 by a commercially available banding device such as a Band-It® stainless steel banding device. With brackets 702 and 704 cinched together, spacer device 700 will hold conduit sections 708 in position within conduit bundle 706. In an exemplary implementation of spacer device 700, a plurality of such devices will be installed at regular intervals, for example, every ten feet, along the length of bundled conduit 706. Conduit bundle 706 is now ready for installation at, above, or below ground.

By creating a network of conduit configured as shown in FIG. 7, each conduit will be identifiable by its location in the conduit bundle at any point in the network. Thus, any particular conduit may be accessed at any point in the network, and its capacity can be made available for lease or sale to third parties. As demonstrated in FIG. 7, the thirty conduit sections may be allocated in subsets of twelve, nine, and nine conduits as indicated by the shading. In an implementation, a bundle may contain conduit sections of varying colors which indicate a use or allocation of the conduit. The conduit capacity of these subsets spanning the entire network or spanning subsections of the network may be leased or sold to third parties or retained by the network owner.

In other implementations of the spacer device, those skilled in the art may appreciate that the bracket shape may conform to other conduit bundle configurations according to the grid design of the guide device. For example, where the guide device positions the sections of conduit in a honeycomb grid with a hexagonal-shaped bundle cross-sectional profile, spacer device may comprise a pair of semi-hexagonal brackets. Where the guide device positions the conduit in channels forming concentric circles, the spacer device may comprise a pair of semi-circular brackets.

Figure 8A:
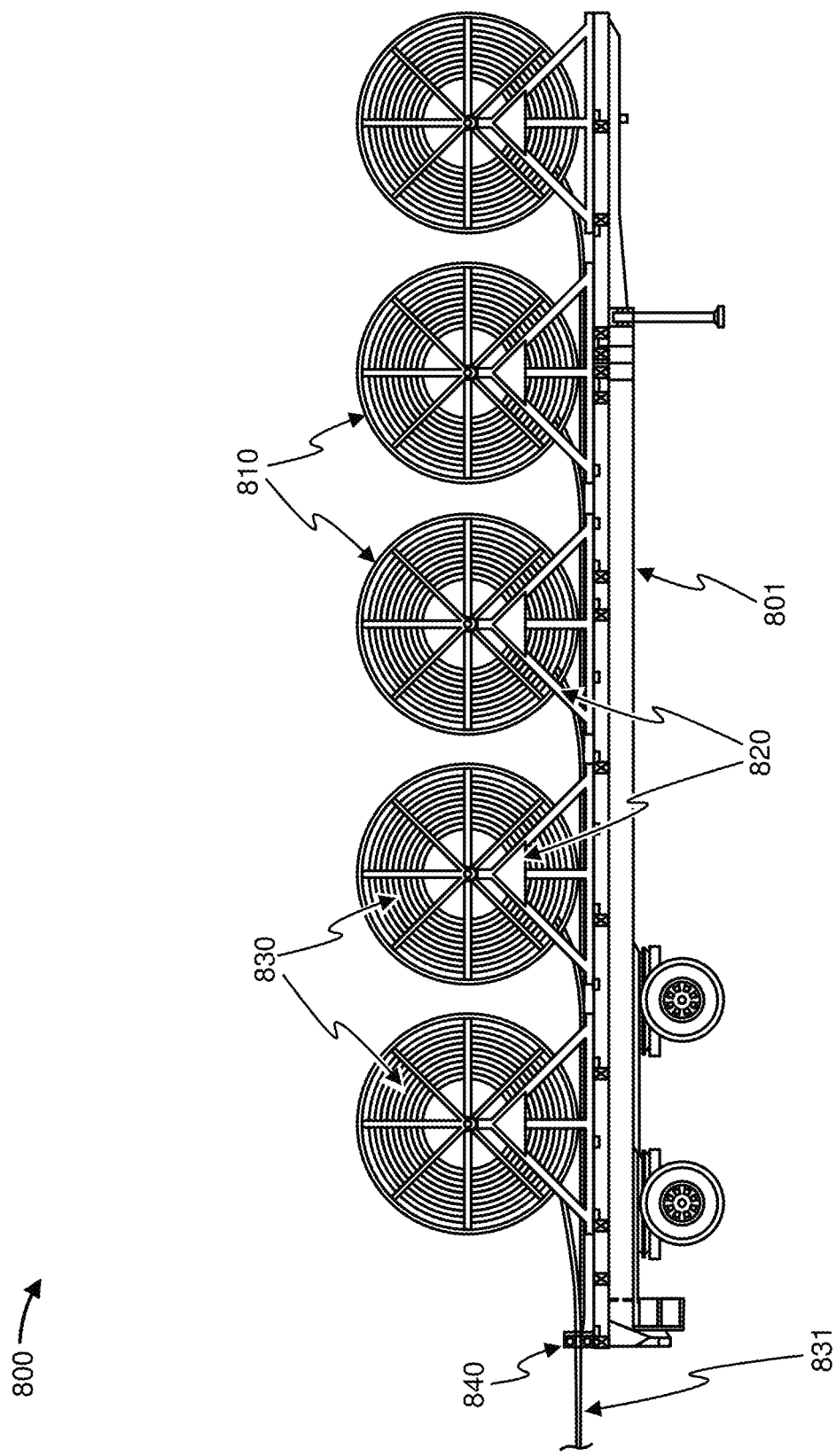
FIGS. 8A and 8B illustrate a conduit trailer system in an implementation.
Figure 8B:
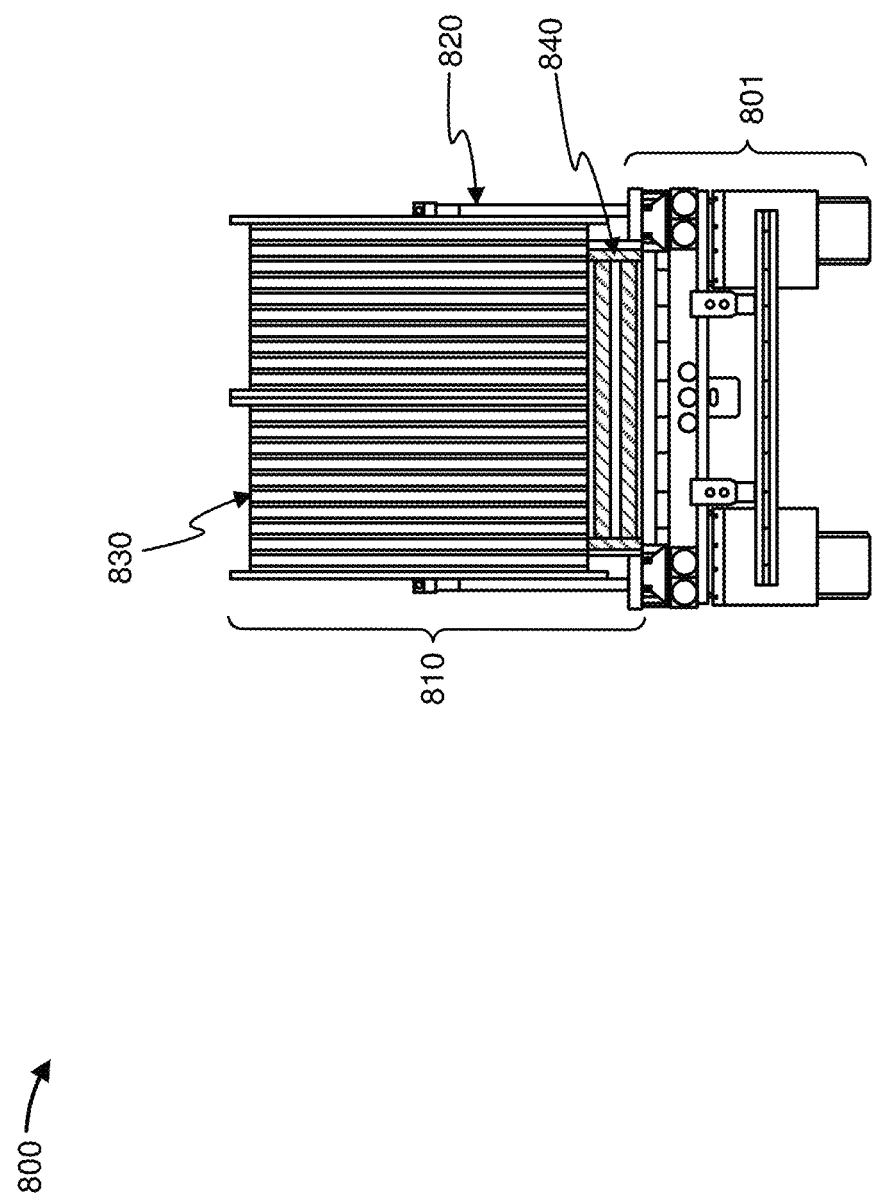

The conduit which is laid is typically supplied in large reels. To feed the multiple sections of conduit into the conduit guide and spacer system, multiple reels may be mounted on a truck bed or trailer. FIGS. 8A and 8B illustrate a conduit trailer system 800 in an implementation. Conduit trailer system 800 comprises portable trailer 801 to which multiple conduit reels 810 are attached. Each of conduit reels 810 is attached to the bed of trailer 801 by reel support system 820 (shown in greater detail in FIGS. 10A-10C below).

FIG. 8A illustrates a side view of trailer 801. In an implementation, ten conduit reels 810 are mounted to trailer 801 such that pairs are of reels are side-by-side with five pairs of reels abreast. Conduit reels 810 comprise 3-way reels of conduit, wherein each reel holds three separate spools of conduit, providing, in this exemplary implementation, thirty sections of conduit. Conduit 830 from conduit reels 810 feeds from the bottom of the reels and passes through conduit organizer 840 mounted at the back end of trailer 801, exiting (at 831) to a conduit guide and spacer system, such as system 500 of FIG. 5B, for installation. It may be appreciated by those in the art that other reel configurations are possible within the scope of the technology. For example, eight 2-way reels of conduit, positioned two abreast on a truck or trailer, may yield 16 conduit sections for bundling in a four-by-four configuration.

In FIG. 8B illustrates an aft view of trailer 801 in an implementation. Conduit 830 feeds from the ten conduit reels 810 as the reels rotate on their respective reel support systems 820. Conduit 830 passes through conduit organizer 840 which organizes the thirty sections of conduit as they feed from conduit reels 810. In various implementations, all conduit reels may feed simultaneously, providing (in this example) 30 sections of conduit passing simultaneously through conduit organizer 840. In other implementations, individual ones or subsets of conduit reels 810 may feed conduit 830 through conduit organizer 840. Conduit organizer 840 spans most of the width of trailer 801 to provide sufficient capacity for handling several sections of conduit.

Figure 9:
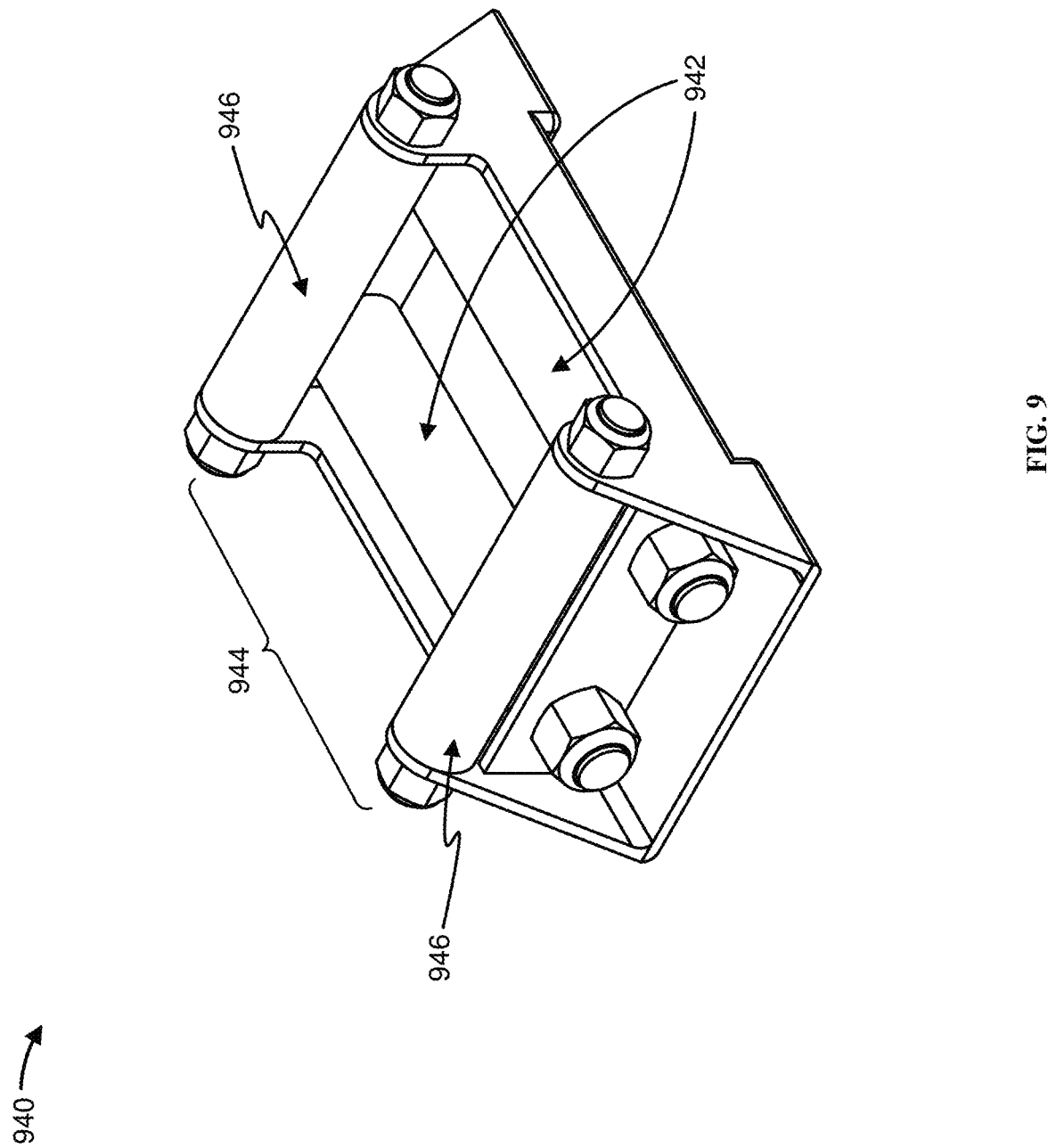
FIG. 9 illustrates a conduit organizer in an implementation.

FIG. 9 illustrates a conduit organizer 940, also known as a roller tamer, in an implementation. Conduit organizer 940 comprises rotating feed rollers 942 through which sections of conduit, such as conduit 830 of FIGS. 8A and 8B, pass for bundling by a conduit guide and spacer system, such as system 500 of FIG. 5B, and installation. In an implementation, feed rollers 942 are adjustably spaced according to the outer diameter of the conduit to be bundled. Length 944 of conduit organizer 940 is sufficient to allow multiple sections of conduit to feed simultaneously, as illustrated in FIG. 8B. Conduit organizer 940 also comprises end rollers 946 which facilitate the feeding of conduit sections at either end of the conduit organizer 940.

Conduit organizer 940 may be mounted to the bed of a reel trailer, such as trailer 801 of FIGS. 8A and 8B, by bolting, clamping, welding, or other means capable of withstanding vibration or other forces of the conduit as it feeds off the conduit reels. In some instances, conduit organizer 940 may be adjustably sized and mounted to the bed according to, for example, the number of reels feeding conduit.

Figure 10C:
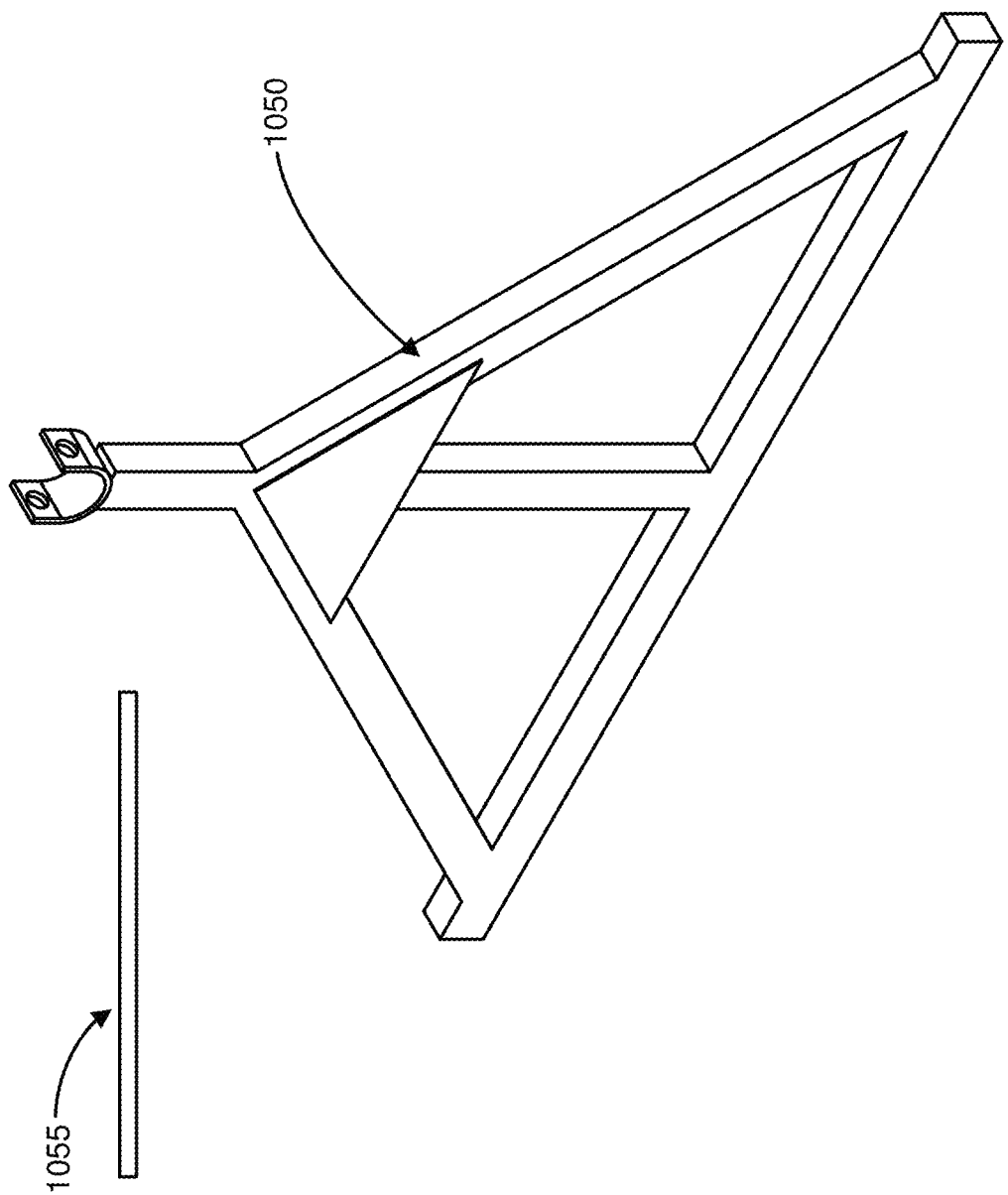

FIGS. 10A-10C illustrate reel support system 1020 for a conduit trailer system in an implementation. Reel support system 1020 comprises A-frame 1050 which supports a transverse-mounted axle 1055. Axle 1055 supports conduit reels 1010 allowing the reels to rotate to continually feed conduit 1030. Axle 1055 may support one or more conduit reels 1010. For example, conduit reels 1010 may be 3-way reels so that the pair of reels feeds a combined total of six sections of conduit. A-frame 1050 may be mounted directly to a truck or trailer bed by bolting, clamping, or welding the bottom portion of A-frame 1050 to the bed.

To summarize, this technology provides the devices, system, and method for configuring and bundling multiple lines of conduit for long-distance network installations. The advantages of such a system are that each conduit in a bundle occupies a known position at every point in the network and therefore the conduit or its contents are locatable and identifiable. In addition, bundling sections of conduit minimizes extraneous bends and undulations in the individual conduit lines while adding rigidity to the bundle as a whole, providing greater protection of the cable housed within. With conduit positioned and bundled into an ordered configuration, the conduit bundle can be laid over long distances in a continuous process that makes installation faster and simpler.

While this technology has been described in terms of several implementations, there are alterations, modifications, permutations, and substitute equivalents which fall within the scope of this technology. Although subsection titles have been provided to aid in the description of the technology, these titles are merely illustrative and are not intended to limit the scope of the technology.

It should also be noted that there are numerous alternative ways of implementing the methods and apparatuses of the technology. It is therefore intended that the following appended claims be interpreted as including all such alterations, modifications, permutations, and substitute equivalents as fall within the true spirit and scope of the technology.

What is claimed is:

1. A device for guiding conduit, comprising:
    an outer frame; and
    walls within the outer frame that intersect to form a grid having multiple channels through which to pass sections of the conduit in parallel;
    wherein each channel of the multiple channels comprises a space defined by a subset of the walls and sized to pass through a single section of the conduit; and
    a device for bundling the conduit, comprising:
    a first angular bracket and a second angular bracket, each angular bracket comprising one or more angles, a first free end, a second free end, an interior face, and an exterior face; and
    the exterior faces of the brackets having a channel indentation running the length of the brackets, wherein a band around the first and second brackets sits in the channel indentation.

2. The device of claim 1 wherein the outer frame comprises an outer wall, and wherein the device further comprises flanges extending from front-facing edges of the outer wall.

3. The device of claim 2 wherein the flanges extending from the front-facing edges of the outer frame are angled outward from the outer wall.

4. The device of claim 1 wherein the outer frame forms a rectangle and the walls form square-shaped channels.

5. The device of claim 1 wherein the outer frame forms a polygon other than a rectangle.

6. The device of claim 1 wherein the outer frame forms a circular shape.

7. The device of claim 1 wherein the grid comprises a honeycomb pattern.

8. The device of claim 1 wherein front-facing edges of the walls are rounded.

9. The device of claim 1 including a bracket device for mounting the device to a vehicle or trailer.

10. The device of claim 1, wherein the conduit comprises fiber optic cable.

11. A method for bundling sections of conduit, comprising:
    feeding sections of conduit through a guide comprising:
        an outer frame; and
        walls within the outer frame that intersect to form a grid having multiple channels through which to pass sections of the conduit in parallel;
        wherein each channel of the multiple channels comprises a space defined by a subset of the walls and sized to pass through a single section of the conduit;
    bundling sections of conduit with brackets comprising:
    a first angular bracket and a second angular bracket, each angular bracket comprising one or more angles, a first free end, a second free end, an interior face, and an exterior face;
    the exterior faces of the brackets having a channel indentation running the length of the brackets;
    positioning the second angular bracket opposite the first angular bracket such that the first free end of the first angular bracket abuts the second free end of the second angular bracket and the second free end of the first angular bracket abuts the first free end of the second angular bracket; and
    wrapping a band around the first and second brackets such that the band sits in the channel indentation.

12. The method of claim 11 wherein the outer frame comprises an outer wall, wherein the device further comprises flanges extending from front-facing edges of the outer wall.

13. The method of claim 11 wherein the outer frame forms a rectangle and the walls form square-shaped channels.

14. The method of claim 11 wherein the outer frame forms a polygon other than a rectangle.

15. The method of claim 11 wherein the grid comprises a honeycomb pattern.

16. The method of claim 11, wherein:
the interior faces of the brackets comprise arcuate indentations conforming to a preferential conduit size.

17. The method of claim 11 wherein a color of one or more of the sections of conduit is different from a color of other sections of conduit and wherein the sections of conduit are positioned for bundling according to a color map.

18. The method of claim 11 further comprising visibly marking a side of the bundled conduit at an angular bracket to indicate an orientation of the bundled conduit.

19. The method of claim 16 wherein the first and second angular brackets comprise one substantially right angle.

20. The method of claim 11, wherein the conduit comprises fiber optic cable.

* * * * *